(12) United States Patent
Ambekar et al.

(10) Patent No.: US 8,493,688 B2
(45) Date of Patent: Jul. 23, 2013

(54) HEAD SLIDER AND HARD DISK DRIVE

(75) Inventors: Rohit P. Ambekar, Sunnyvale, CA (US); Karl A. Flechsig, Los Gatos, CA (US); Remmelt Pit, Menlo Park, CA (US); Oscar J. Ruiz, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 103 days.

(21) Appl. No.: 12/868,610

(22) Filed: Aug. 25, 2010

(65) Prior Publication Data
US 2012/0050918 A1 Mar. 1, 2012

(51) Int. Cl.
*G11B 5/60* (2006.01)
(52) U.S. Cl.
USPC .................... 360/236.2; 360/236.3
(58) Field of Classification Search
USPC .......... 360/235.8–235.9, 235.5, 235.6, 235.7, 360/236, 236.1, 236.2, 236.3
See application file for complete search history.

(56) References Cited

U.S. PATENT DOCUMENTS

| | | | |
|---|---|---|---|
| 5,430,591 A | 7/1995 | Takeuchi et al. | |
| 5,490,025 A | 2/1996 | Dorius et al. | |
| 5,490,026 A | 2/1996 | Dorius et al. | |
| 5,798,889 A | 8/1998 | Dorius et al. | |
| 6,594,113 B2 | 7/2003 | Rao et al. | |
| 6,744,599 B1 | 6/2004 | Peng et al. | |
| 6,809,904 B2 | 10/2004 | Boutaghou et al. | |
| 6,922,313 B1 | 7/2005 | Gitis et al. | |
| 6,982,851 B2 | 1/2006 | Yamamoto et al. | |
| 6,989,966 B2 | 1/2006 | Rajakumar | |
| 7,099,114 B2 | 8/2006 | Kang | |
| 7,123,449 B2 | 10/2006 | Kang | |
| 7,333,297 B2 | 2/2008 | Park | |
| 7,339,766 B2 | 3/2008 | Yao et al. | |
| 7,450,343 B2 | 11/2008 | Huang | |
| 7,515,384 B2 | 4/2009 | Huang | |
| 2002/0089790 A1 | 7/2002 | Stoebe et al. | |
| 2010/0149692 A1* | 6/2010 | Fujimaki et al. | ........... 360/235.8 |

OTHER PUBLICATIONS

Vinod Sharma et al., Head and media design considerations for reducing thermal asperity, Tribology International, May 2001, pp. 307-314, vol. 34, Issue 5, Elsevier Science Ltd.
Naoto Kojima et al., Flying characteristics of a novel negative pressure slider "Papillon", Journal of Applied Physics, 1997, vol. 81, Issue 8, pp. 5399-5401, American Institute of Physics, Apr. 1997.

* cited by examiner

*Primary Examiner* — Brian Miller
(74) *Attorney, Agent, or Firm* — Patterson & Sheridan, LLP

(57) ABSTRACT

A head slider for a disk drive storage device. The head slider is adapted to fly at the target height above the disk, reduce contamination by preventing particles from being trapped under the head slider, fly well in helium at low velocity and obtain a manufacturing tolerance so that multiple head sliders may be produced and function properly. The head slider has an internal cavity that is substantially enclosed by the air bearing surface. There are two gaps in the air bearing surface that are misaligned relative to the leading edge. The gaps aid in preventing particles from entering the cavity.

18 Claims, 6 Drawing Sheets

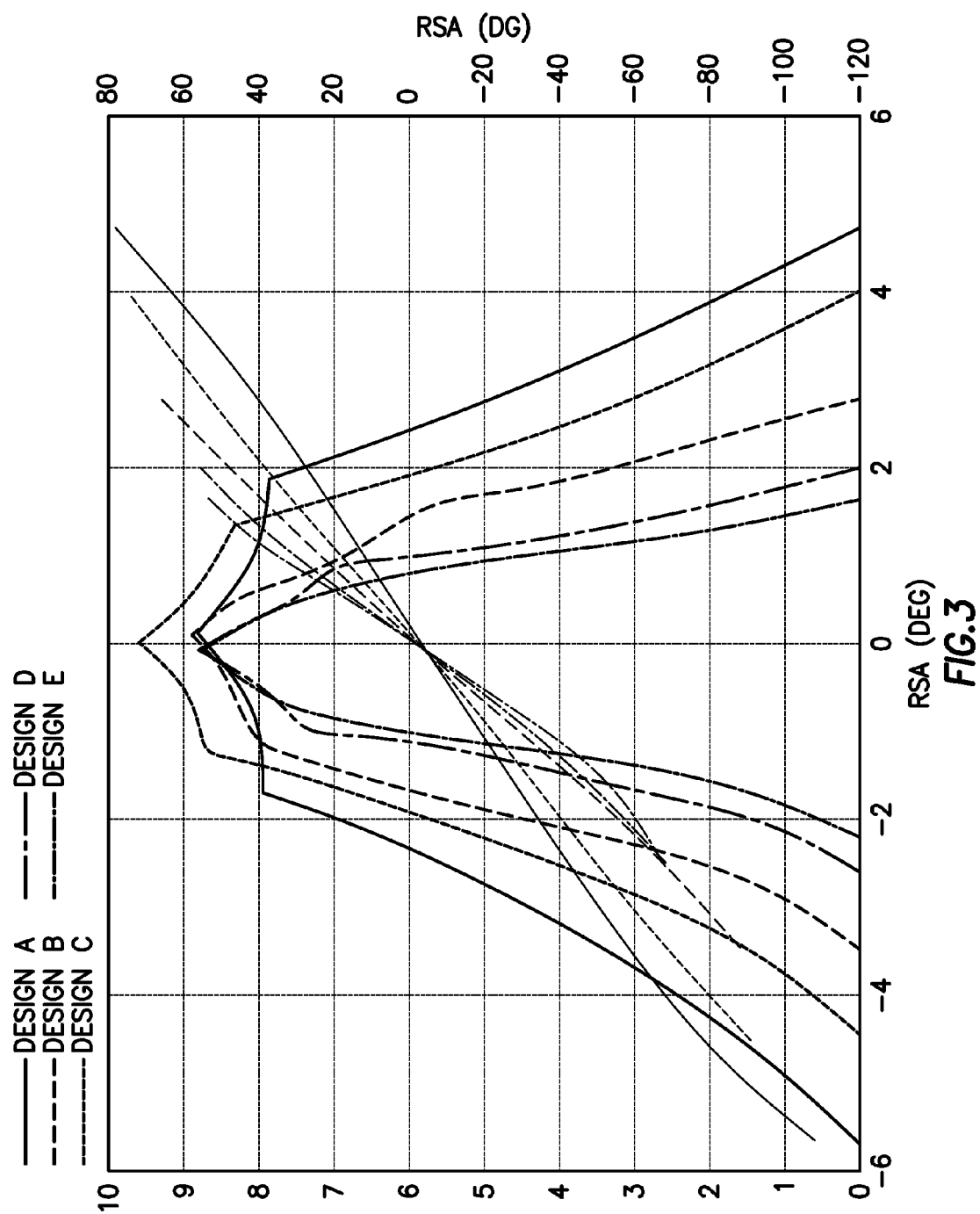

HEAD SLIDER AND HARD DISK DRIVE

BACKGROUND OF THE INVENTION

1. Field of the Invention

Embodiments of the present invention generally relate to a head slider within disk drive storage devices.

2. Description of the Related Art

Hard disk drives are used in many computer system operations. In fact, many computing systems operate with some type of hard disk drive to store the most basic computing information, e.g., the boot operation, the operating system, the applications, etc. In general, the hard disk drive is a device, which may or may not be removable, but without which, some computing systems may not operate.

A typical hard disk drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA). The assembly consisting of the disks, HGAs, spindle, housing, and the other parts internal to the housing is called the head disk assembly, or HDA.

In operation, the hard disk is rotated at a set speed via a spindle motor assembly having a central drive hub. Additionally, there are channels or tracks spaced at known intervals across the disk. Most current embodiments arrange the signal regions in concentric circular tracks, but other designs, such as spirals or irregular closed or open paths, are possible and useful. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk. Refinements of the disk and the head have provided reductions in the size of the hard disk drive.

The ever increasing need for data storage has led some disk drive makers to steadily increase the amount of data stored on a drive. Mechanical considerations, radiated audible noise limits, power requirements, and other factors limit the number of disks that can be economically combined in a single drive. Thus, disk drive technology has generally focused on increasing the amount of data stored on each disk surface by positioning the heads more closely to the media surface. However, care must be taken to avoid unintended contact between the head components and the moving media surface.

Typically, the heads are lightly spring loaded, with the spring tension perpendicular to the media surface plane and directed against the media surface. An air bearing separates the head and media surfaces as follows. As the media moves relative to the head, air is dragged by the disk surface through specifically designed channels in the surface of the head adjacent to the media surface. The surface of the head and the channels contained therein, collectively referred to as the air-bearing surface (ABS), are designed to generate regions of increased air pressure in between the ABS and media surface that forces the head away from direct contact with the media surface, in effect causing the head to fly above the media surface. The separation of the head ABS and media surface, commonly called fly height, is a complex phenomenon primarily a function of air density, the spring preload, the relative speed between the head and media surface, and the pattern of channels present on the head air bearing surface adjacent to the media surface. It is well known to those familiar with head-disk interface design that a particular head-disk combination will not fly precisely at the desired separation. Variances in mechanical tolerances, spring tensions, and other factors result in a nearly Gaussian statistical fly-height population distribution generally centered about the mean fly height. Furthermore, the head and its mounting gimbal are subject to mechanical tolerances, windage forces, and inertial forces that can cause it to deviate from the desired attitude with respect to the media surface, (e.g., static and dynamic pitch and roll). This can move some areas of the air bearing surface closer or further from the media surface.

Therefore, there is a need in the art for a head slider design that is capable of reducing contamination, maintaining a desired fly height, and has acceptable manufacturing tolerances to permit reproduction of the head slider.

SUMMARY OF THE INVENTION

The present invention generally relates to a head slider within a disk drive storage device. In general, the goals for the head slider include flying at the target height above the disk, improving contamination robustness by preventing particles from being trapped under the head slider, and obtaining a manufacturing tolerance so that multiple head sliders may be produced and function properly. The head slider discussed herein has an internal cavity that is substantially enclosed by the air bearing surface. There are two gaps in the air bearing surface that are misaligned relative to the leading edge. The specific design of the head slider of the present invention meets all three of the goals.

In one embodiment, a head slider for a hard disk drive is disclosed. The head slider includes a head body having a leading edge, a trailing edge, an outside edge, an inside edge, and an air bearing surface disposed on the head body. The air bearing surface has a leading portion extending across the leading edge between the outside edge and the inside edge. The leading portion has a first flange extending in a direction substantially parallel to the outside edge. The leading portion has a second flange extending in a direction substantially parallel to the inside edge. The air bearing surface also has a tail portion. The tail portion has an outside portion extending substantially parallel to the outside edge. The outside portion is spaced from the first flange by a first distance to define a first gap. The tail portion also has an inside portion extending substantially parallel to the inside edge. The inside portion is spaced from the second flange by a second distance to define a second gap. The first gap and the second gap are aligned along a line that is at an angle relative to each of the leading edge, the outside edge, the trailing edge, and the inside edge. The tail portion also includes a trailing portion that is coupled between the outside portion and the inside portion. The trailing portion has a trailing pad, a first wall extending between the trailing pad and the outside portion, and a second wall extending between the trailing pad and the inside portion.

In another embodiment, a hard disk drive is disclosed. The hard disk drive includes a magnetic disk having a surface. The magnetic disk, when rotating, creates airflow in a direction substantially tangential to the magnetic disk. The hard disk drive also includes an actuator arm designed and configured to support a head slider over the disk surface at an inner diameter position, an outer diameter position, and positions between the inner diameter and outer diameter positions. The head slider includes a head body having a leading edge, a trailing edge, an outside edge, an inside edge, and an air bearing surface disposed on the head body. The air bearing surface has a leading portion extending across the leading edge between the outside edge and the inside edge. The leading portion has a first flange extending in a direction substantially parallel to the outside edge. The leading portion has a second flange extending in a direction substantially parallel to the inside edge. The air bearing surface also has a tail portion. The tail portion has an outside portion extending substantially parallel to the outside edge. The outside portion is spaced from the first flange by a first distance to define a first gap. The tail portion also has an inside portion extending substantially parallel to the inside edge. The inside portion is spaced from the second flange by a second distance to define a second gap. The first gap and the second gap are aligned along a line that is at an angle relative to each of the leading edge, the outside edge, the trailing edge, and the inside edge. The tail portion also includes a trailing portion that is coupled between the outside portion and the inside portion. The trailing portion has a trailing pad, a first wall extending between the trailing pad and the outside portion, and a second wall extending between the trailing pad and the inside portion.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a graph showing the improved performance of a head slider in a helium environment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1A:
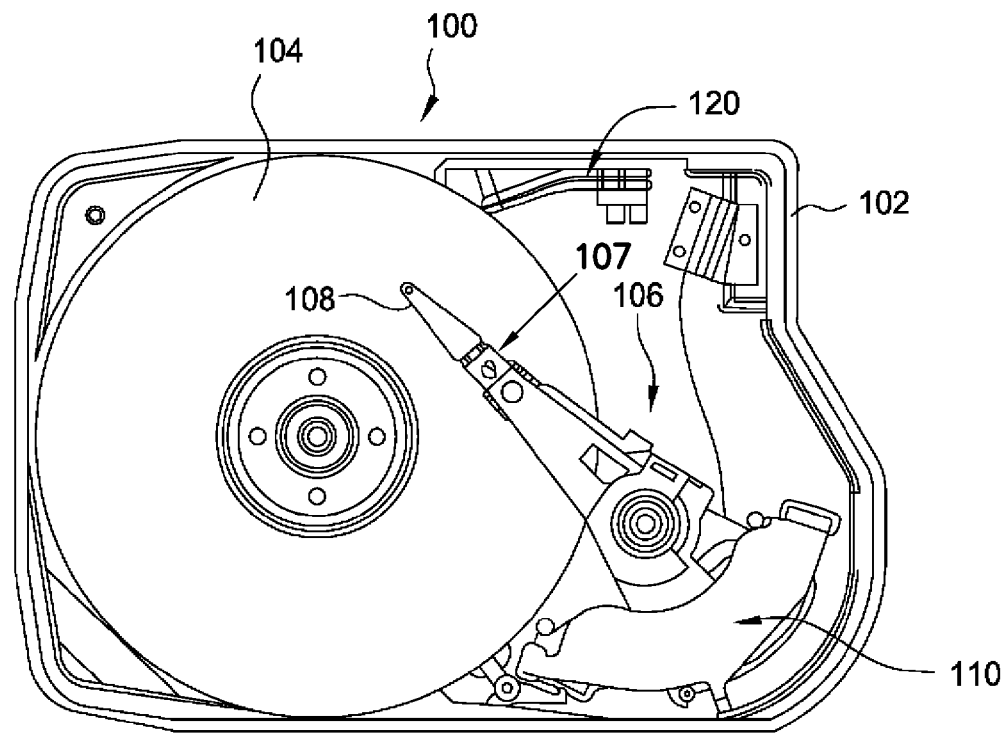
FIG. 1A is a schematic top view of a disk drive.

FIG. 1A shows one embodiment of a magnetic hard disk drive 100 that includes a housing 102 within which a magnetic disk 104 is fixed to a spindle motor (SPM) by a clamp. The SPM drives the magnetic disk 104 to spin at a certain speed. A head slider 108 accesses a recording area of the magnetic disk 104. The head slider 108 has a head element section and a slider to which the head element section is fixed. The head slider 108 is provided with a fly-height thermal control device which adjusts the flying height of the head above the magnetic disk 104. An actuator 106 carries the head slider 108. In FIG. 1A, the actuator 106 is pivotally held by a pivot shaft, and is pivoted around the pivot shaft by the drive force of a voice coil motor (VCM) 110 as a drive mechanism. The actuator 106 is pivoted in a radial direction of the magnetic disk 104 to move the head slider 108 to a desired position. Due to the viscosity of air between the spinning magnetic disk 104 and the head slider's ABS facing the magnetic disk 104, a pressure acts on the head slider 108. The head slider 108 flies low above the magnetic disk 104 as a result of this pressure balancing between the air and the force applied by the suspension 107 toward the magnetic disk 104. In some embodiments, the head slider 108 may have raised areas or portions (such as pads) that actually contact disk 104, as opposed to the slider head "flying" over the disk 104. In some embodiments, the disk drive 100 may include a ramp 120, where the head slider 108 is parked when the disk drive 100 is not in operation and disk 104 is not rotating.

Figure 1C:
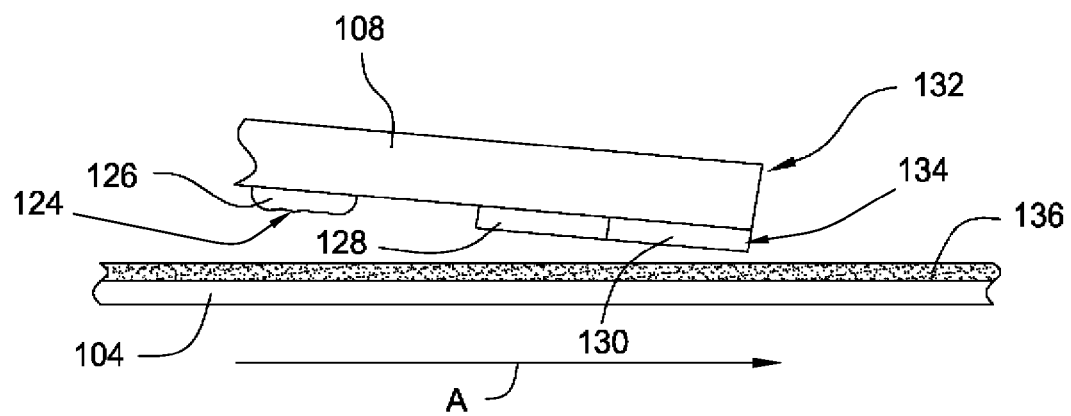
FIG. 1C is a side view of a head slider and magnetic disk.
Figure 1B:
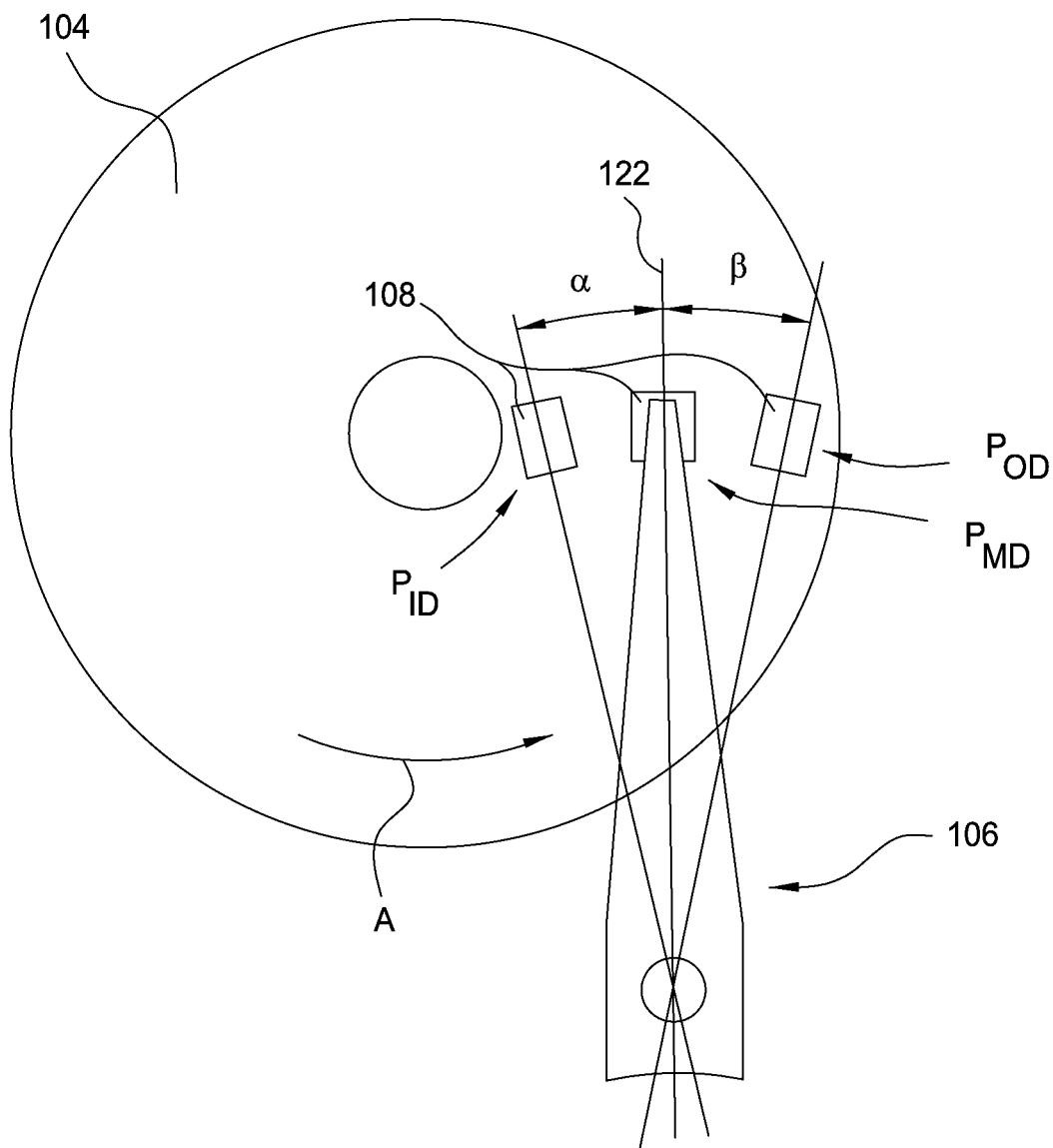
FIG. 1B is a schematic illustration showing the skew angles of the head slider at different positions with respect to a magnetic disk.

FIG. 1B is a diagram showing skew angles of the head slider 108 at different positions with respect to the magnetic disk 104. Actuator arm 106 supports the head slider 108 above the surface of the magnetic disk 104 at locations including an inner diameter (ID) position $P_{ID}$, an outer diameter (OD) position $P_{OD}$ and positions between $P_{ID}$ and $P_{OD}$. As the disk 104 spins, it produces airflow in a direction tangential to the disk in the direction the disk spins, as shown by arrow A. When the head slider 108 is at the mid-disk position $P_{MD}$, the centerline 122 of the head slider 108 is approximately aligned with the direction of the airflow produced by the disk 104, and the skew angle is therefore 0 (zero). When the head slider 108 is at other positions over the disk, however, the centerline 122 of the head slider 108 is not aligned with the direction of the airflow produced by the disk 104, and the angle of misalignment is known as the skew angle. As shown in FIG. 1B, when the head slider is at the ID position $P_{ID}$, the skew angle is α, which is the maximum skew angle in the ID direction, and when the head slider is at the OD position $P_{OD}$, the skew angle is β, which is the maximum skew angle in the OD direction. The skew angle affects the flying characteristics of the head slider ABS. Generally, the greater the skew angle, the lower the lift produced for a given airflow velocity. In addition, the airflow velocity produced by the spinning disk 104 is dependent on the distance from the center of the disk. At head slider fly heights, the tangential airflow produced by the disk is very close to the tangential velocity of the disk. This tangential velocity is equal to (RPM)×2πR, where RPM is the rotations per minute of the disk, and R is the distance from the head slider location to the center of the disk. Often these effects combine to produce a fly height profile wherein the head slider tends to fly higher at the mid-disk position $P_{MD}$ and decreases in both directions to minimum values at the ID position $P_{ID}$ and the OD position $P_{OD}$. This phenomenon is known as mid disk (MD) fly height hump as described above.

FIG. 1C is a side view of the head slider 108 and the magnetic disk 104 of FIG. 1A. Magnetic disk 104 is moving in the direction of arrow A, (as also shown in FIG. 1B), and causes airflow in the same direction. This airflow flows under the air bearing surface (ABS) 124 of the head slider 108 and produces the lifting pressure described above. In one embodiment, head slider 108 includes raised areas such as front pad 126, side pads 128 and trailing pad 130. Trailing pad 130, located adjacent to and centered relative to the trailing edge 132 of the head slider 108, may further include the read/write head 134 that writes and reads data to and from magnetic disk 104. Disk 104 has a thin lubricant layer 136 on its upper surface to protect the disk 104 from contact with the head slider 108.

Figure 2A:
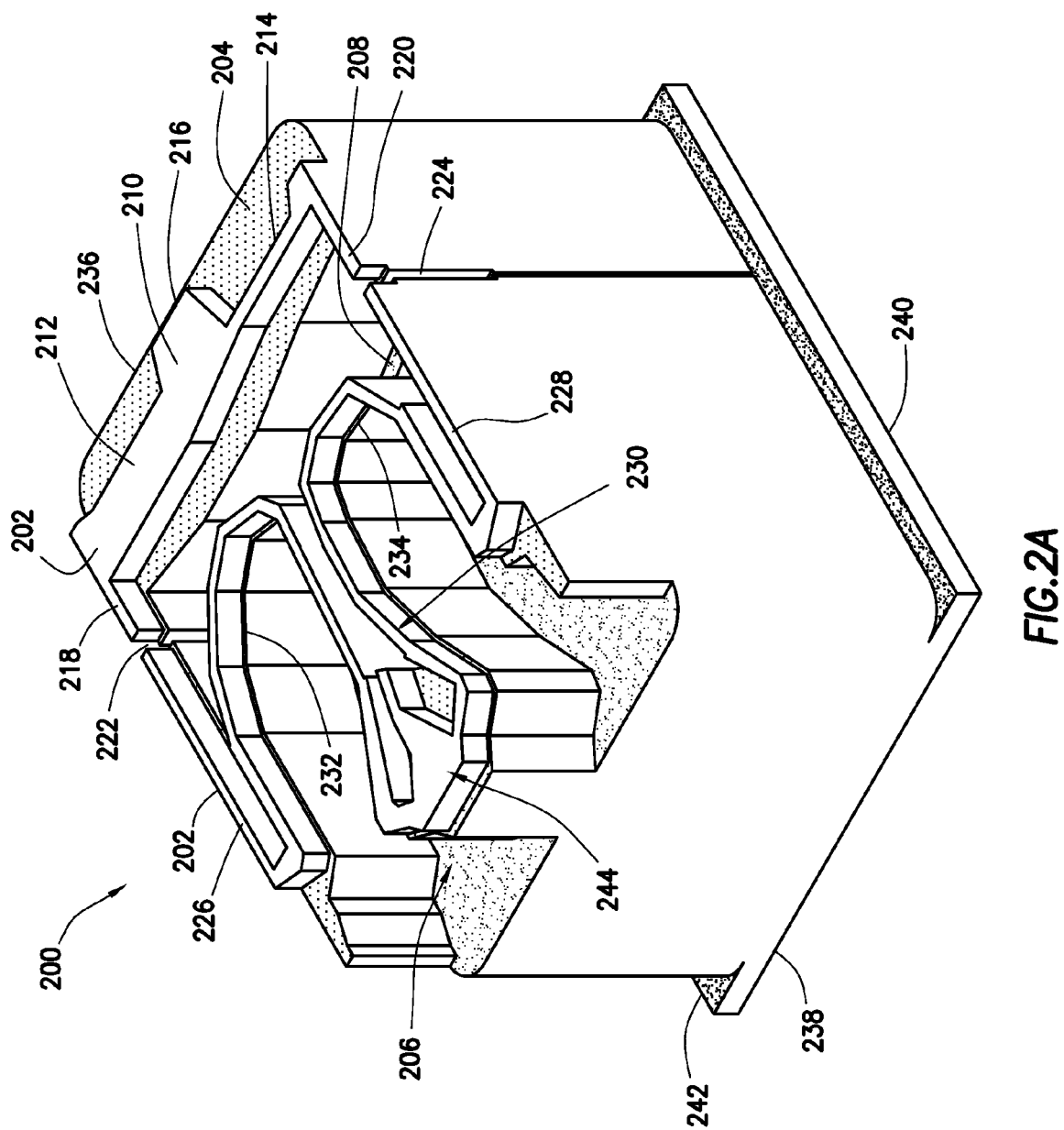
FIGS. 2A-2C are schematic views of a head slider according to one embodiment.
Figure 2B:
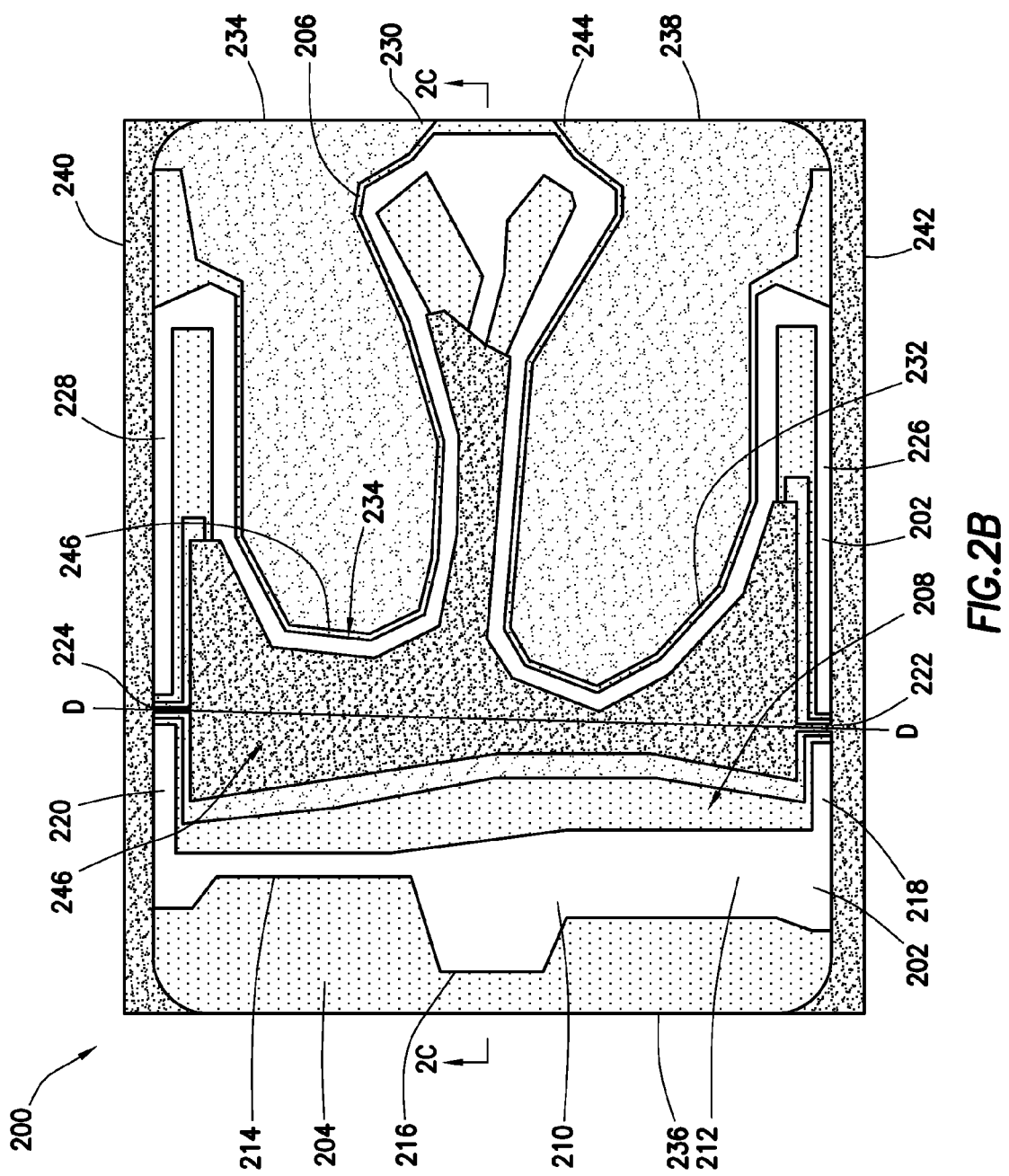
Figure 2C:
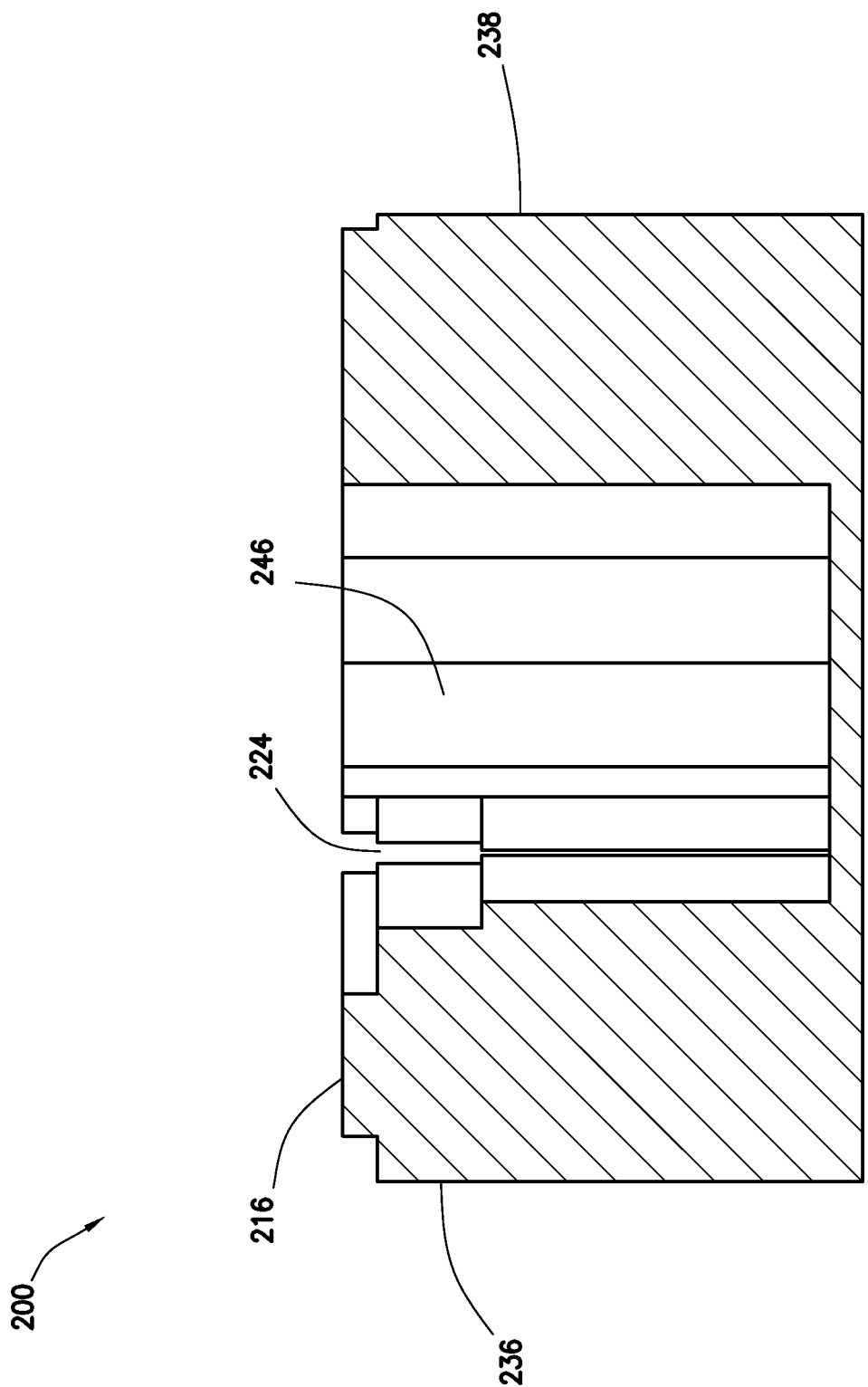

FIGS. 2A-2C are schematic views of a head slider 200 according to one embodiment. One aspect of the head slider 200 is the extension of the side rails to close the sides as much as possible while at the same time reshaping the side U-pockets to increase the roll stiffness and reconfiguring the rear pad so that the altitude, fly height, and fly height profile are kept within a predetermined target. Illustratively, the head slider 200 of FIGS. 2A-2C is a femto-sized head slider with three different etch depths, although other embodiments may include additional etch depths. The head slider 200 may be manufactured using any known or as yet unknown fabrication techniques for head sliders. The front and side rails prevent particles from getting under the ABS 202 and causing the head slider 200 scratches or disk scratches. The U-shaped pockets on the sides pressurize during operation and are tailored specifically to provide high rolling stiffness while flying in helium at low velocity.

The head slider 200 has a leading edge 236, a trailing edge 238, an outside edge 242, and an inside edge 240. The outside edge 242 of the head slider 200 will be the portion of the head slider 200 that is at the furthest radial side from the center of the rotating disk. Consequently, the inside edge 240 is the portion of the head slider 200 that is the closest radial side to the center of the rotating disk.

The head slider 200 also includes an ABS 202 which, for ease of understanding, will be considered to be at the zero or base level because the ABS 202 is the bottommost level of the head slider 200 when the head slider 200 is in operation above the rotating disk. The ABS 202 has a leading portion 210 that extends between the outside edge 242 and the inside edge 240. The leading portion 210 has a first flange 218 that extends substantially parallel to the outside edge 242 and a second flange 220 that extends substantially parallel to the first flange 218 and substantially parallel to the inside edge 240. The leading portion 210 also has a head 216 extending outward from the leading portion 210 towards the leading edge 236. The leading portion 210 also has a section 212 closer to the outside edge 242 and a section 214 that is closer to the inside edge 240. The section 212 that is closer to the outside edge 242 is wider than the section 214 that is closer to the inside edge 240.

The ABS 202 also has a tail portion 206. The tail portion 206 includes an outside portion 226 extending substantially parallel to the outside edge 242. The outside portion 226 is spaced from the first flange 218 by a first distance to define a first gap 222. The tail potion 206 also includes an inside portion 228 extending substantially parallel to the inside edge 240, the outside edge 242, and the outside portion 226. The inside portion 228 is spaced from the second flange 220 by a second distance to define a second gap 224. The first gap 222 and the second gap 224 are aligned along a line (D-D) that is at an angle relative to each of the leading edge 236, the outside edge 242, the trailing edge 238, and the inside edge 240. Both the first gap 222 and the second gap 224 may have a width of between about 10 nanometers and about 50 nanometers.

The tail portion 206 also includes a trailing portion 230. The trailing portion 230 is coupled between the outside portion 226 and the inside portion 228. The trailing portion 230 has a trailing pad 244, a first wall 232 extending between the trailing pad 244 and the outside portion 226, and a second wall 234 extending between the trailing pad 244 and the inside portion 228. As shown in FIG. 2B, both the first wall 232 and the second wall 234 have portions that are substantially parallel to the outside portion 226 and inside portion 228. Additionally, both the first wall 232 and the second wall 234 have curved portions. As shown in FIG. 2B, the curved portion of the second wall 234 extends closer to leading portion 210 than the first wall 232. Thus, the first wall 232 is longer than the second wall 234.

The head slider 200 has several different depths. While the depths will be discussed in terms of the average total depth, it is to be understood that the transition between each depth level may be either abrupt or gradual. The different levels may be plateaus due to their substantially flat surface. The first level of depth is the zero or base level of the ABS 202. The second level 204 is at a depth of between about 0.05 microns and about 0.5 microns relative to the first level, according to one embodiment. The third level 208, has a depth of between about 0.5 microns and about 1.5 microns relative to the first level, according to one embodiment. The fourth level 246, which is the deepest depth, is between about 1.5 microns and about 5.0 microns relative to the first level, according to one embodiment. The fourth level 246 separates the leading portion 210 from the tail portion 206. It is the largest area enclosed within the ABS 202. The fourth level or cavity 246 functions as a cavity that is substantially enclosed by the ABS 202. The cavity 246 is bound by the first flange 218, the second flange 220, the outside portion 226, the inside portion 228, and the trailing portion 230.

As can be seen from FIGS. 2A-2C, the second level 204 is present between the leading edge 236 and the leading portion 210. The second level 204 is also present between the leading portion 210 and the cavity 246, between the cavity 246 and the transition between the inside portion 228 and the trailing portion 230, between the cavity 246 and the transition between the outside portion 226 and the trailing portion 230, and within the trailing pad 244. Due to the depth of the second level 204 (or height when the head slider 200 is in the operating position), the second level 204 and the ABS 202 operate to push aside any large particles so that the particles do not enter the cavity 246 or change the fly height of the head slider.

In operation, the disk generally rotates at a speed of up to about 10,000 revolutions per minute. About one and a half grams of force press the head slider 200 towards the disk so that the head slider 200 flies above the disk. There are typically two head sliders 200 per disk. One on the topside of the disk and one on the bottom side of the disk so that both sides of the disk may be utilized. The pressing force, along with the pattern of the ABS 202, affects the fly height for the head slider 200.

One goal for the head slider 200 is to fly at the predetermined, constant target height. In order to maintain the head slider 200 at the target height, there are several factors that affect the fly height. One factor is the rotational speed of the disk. Another factor is the air pressure and temperature sensitivity. For example, the air pressure in higher altitudes is different than at lower altitudes. Thus, the fly height may be different in Colorado as compared to Texas. Another factor that affects the fly height is the angle of the head slider changes as the head slider 200 moves from a position closer to the center of the disk to a location near the outer edge of the disk.

Another goal of the head slider 200 is to have a manufacturing tolerance because each head slider 200 manufactured may not be exactly identical. Thus, the pattern for the head slider 200 should be able to have slight variations, but still function effectively. The design shown in FIGS. 2A-2C has sufficient manufacturing tolerance to permit the head slider 200 to be able to function properly even if each head slider 200 is not exactly identical.

Another aspect which may be achieved by the head slider 200 is the prevention of contamination. The problem of contamination robustness is a common one in most air bearing applications. Although various air bearing features have been devised to better handle particle contamination, they often degrade the performance of the air bearing surface. The embodiment shown in FIGS. 2A-2C provides a unique ABS 202 with walls all around the front and sides of the air bearing within only very small gaps 222, 224 through the sides. The leading portion 210 presents some U-shaped features for better pressurization and the side walls extend near the end of the head slider 200. Contamination occurs when particles that are on the surface of the disk get caught or trapped within the head slider 200. Most particles will be pushed aside as they encounter the second level 204 or the leading portion 210. However, some particles may attempt to enter the cavity through the side. The gaps 222, 224 are designed to be sufficiently large to let enough air into the cavity 246. The direction D-D joining the gaps is almost perpendicular to the disk velocity so particles cannot enter directly into the cavity through these gaps.

One of the benefits of the design of the head slider 200 is that the head slider 200 will function properly not only during normal operation in air, but also when the servo data is written onto the disk. The servo writing is performed in helium at a lower rotational speed than during reading. In one embodiment, the rotational speed in helium may be about 6,600 revolutions per minute. In another embodiment, the rotational speed in helium may be about 5,000 revolutions per minute. The head slider 200 typically loses its roll stiffness and becomes more prone to lose clearance and come into contact with the disk. To prevent contact with the disk, high roll stiffness in helium at low rotational speed is needed. The head slider 200 shown in FIGS. 2A-2C has a much broader range of roll stiffness. Besides being good at contamination prevention and servo writing, the head slider 200 has excellent altitude performance, low sensitivity to manufacturing tolerance and a low fly height sigma. Other designs do well in altitude performance, but lack good servo writing characteristics or contamination resistance.

FIG. 3 shows the roll stiffness of a head slider according to an embodiment of the present invention (labeled Design A) compared to that of previous head sliders (labeled Design B, Design C, Design D and Design E). The horizontal axis shows the amount of roll static attitude (RSA) produced by the flexure and is measured in degrees, while the left vertical axis shows the clearance measured in nanometers. The right vertical axis shows the roll angle induced by the flexure RSA and is measured in micro radians. Under high RSA the head slider of the present invention, Design A, loses less clearance. As shown in FIG. 3, there is a very wide range of RSA for the head slider of the present invention (labeled Design A). In fact, the head slider Design A exhibits very little roll even at high RSA.

The head slider discussed herein is advantageous because the head slider will function well not only within normal operating conditions, but also during servo write conditions. Additionally, the head slider discussed herein is beneficial in preventing contamination from particles that can cause the head slier to be scratched, scratch the disk, or cause the head slider to crash onto the disk.

While the foregoing is directed to embodiments of the present invention, other and further embodiments of the invention may be devised without departing from the basic scope thereof, and the scope thereof is determined by the claims that follow.

What is claimed is:

1. A head slider for a hard disk drive, comprising:
a head body having a leading edge, a trailing edge, an outside edge, an inside edge, and an air bearing surface disposed on the head body, the air bearing surface having:
a leading portion extending across the leading edge between the outside edge and the inside edge, the leading portion having a first flange extending in a direction substantially parallel to the outside edge, the leading portion having a second flange extending in a direction substantially parallel to the inside edge; and
a tail portion, the tail portion having:
an outside portion extending substantially parallel to the outside edge, the outside portion spaced from the first flange by a first distance to define a first gap;
an inside portion extending substantially parallel to the inside edge, the inside portion spaced from the second flange by a second distance to define a second gap, wherein the first gap and the second gap are aligned along a line that is at an angle relative to each of the leading edge, the outside edge, the trailing edge, and the inside edge; and
a trailing portion coupled between the outside portion and the inside portion, the trailing portion having a trailing pad, a first wall extending between the trailing pad and the outside portion, and a second wall extending between the trailing pad and the inside portion, wherein the air bearing surface substantially encloses a cavity and wherein the cavity is bound by the first flange, the second flange, the outside portion, the inside portion, and the trailing portion.

2. A head slider for a hard disk drive, comprising:
a head body having a leading edge, a trailing edge, an outside edge, an inside edge, and an air bearing surface disposed on the head body, the air bearing surface having:
a leading portion extending across the leading edge between the outside edge and the inside edge, the leading portion having a first flange extending in a direction substantially parallel to the outside edge, the leading portion having a second flange extending in a direction substantially parallel to the inside edge; and
a tail portion, the tail portion having:
an outside portion extending substantially parallel to the outside edge, the outside portion spaced from the first flange by a first distance to define a first gap;
an inside portion extending substantially parallel to the inside edge, the inside portion spaced from the second flange by a second distance to define a second gap, wherein the first gap and the second gap are aligned along a line that is at an angle relative to each of the leading edge, the outside edge, the trailing edge, and the inside edge; and
a trailing portion coupled between the outside portion and the inside portion, the trailing portion having a trailing pad, a first wall extending between the trailing pad and the outside portion, and a second wall extending between the trailing pad and the inside portion, wherein the first wall is longer than the second wall.

3. The head slider of claim 1, wherein the cavity has a height of between about 1.5 microns and about 5 microns.

4. The head slider of claim 1, wherein the leading portion has a first width adjacent the first flange and a second width adjacent the second flange, wherein the first width is greater than the second width.

5. The head slider of claim 2, wherein the air bearing surface substantially encloses a cavity.

6. The head slider of claim 2, wherein the first gap and the second gap are between about 10 nm to about 100 nm wide.

7. The head slider of claim 2, wherein the leading edge has a plateau that has a height of between about 0.05 microns and about 0.5 microns.

8. The head slider of claim 2, wherein a plateau is present between the outside portion and the trailing portion and wherein the plateau has a height of between about 0.5 microns and about 1.5 microns.

9. The head slider of claim 2, wherein the trailing portion encloses a plateau that has a height of between about 0.05 microns and about 0.5 microns.

10. A hard disk drive, comprising:
a magnetic disk having a surface, the magnetic disk, when rotating, creating an airflow in a direction substantially tangential to the magnetic disk; and
an actuator arm designed and configured to support a head slider over the disk surface at an inner diameter position, an outer diameter position, and positions between the inner diameter and outer diameter positions, the head slider comprising:
a head body having a leading edge, a trailing edge, an outside edge, an inside edge, and an air bearing surface disposed on the head body, the air bearing surface having:
a leading portion extending across the leading edge between the outside edge and the inside edge, the leading portion having a first flange extending in a direction substantially parallel to the outside edge, the leading portion having a second flange extending in a direction substantially parallel to the inside edge; and
a tail portion, the tail portion having:
an outside portion extending substantially parallel to the outside edge, the outside portion spaced from the first flange by a first distance to define a first gap;
an inside portion extending substantially parallel to the inside edge, the inside portion spaced from the second flange by a second distance to define a second gap, wherein the first gap and the second gap are aligned along a line that is at an angle relative to each of the leading edge, the outside edge, the trailing edge, and the inside edge; and
a trailing portion coupled between the outside portion and the inside portion, the trailing portion having a trailing pad, a first wall extending between the trailing pad and the outside portion, and a second wall extending between the trailing pad and the inside portion, wherein the air bearing surface substantially encloses a cavity and wherein the cavity is bound by the first flange, the second flange, the outside portion, the inside portion, and the trailing portion.

11. The hard disk drive of claim 10, wherein the cavity has a height of between about 1.5 microns and about 5 microns.

12. The hard disk drive of claim 10, wherein the leading portion has a first width adjacent the first flange and a second width adjacent the second flange, wherein the first width is greater than the second width.

13. A hard disk drive, comprising:
a magnetic disk having a surface, the magnetic disk, when rotating, creating an airflow in a direction substantially tangential to the magnetic disk; and
an actuator arm designed and configured to support a head slider over the disk surface at an inner diameter position, an outer diameter position, and positions between the inner diameter and outer diameter positions, the head slider comprising:
a head body having a leading edge, a trailing edge, an outside edge, an inside edge, and an air bearing surface disposed on the head body, the air bearing surface having:
a leading portion extending across the leading edge between the outside edge and the inside edge, the leading portion having a first flange extending in a direction substantially parallel to the outside edge, the leading portion having a second flange extending in a direction substantially parallel to the inside edge; and
a tail portion, the tail portion having:
an outside portion extending substantially parallel to the outside edge, the outside portion spaced from the first flange by a first distance to define a first gap;
an inside portion extending substantially parallel to the inside edge, the inside portion spaced from the second flange by a second distance to define a second gap, wherein the first gap and the second gap are aligned along a line that is at an angle relative to each of the leading edge, the outside edge, the trailing edge, and the inside edge; and
a trailing portion coupled between the outside portion and the inside portion, the trailing portion having a trailing pad, a first wall extending between the trailing pad and the outside portion, and a second wall extending between the trailing pad and the inside portion and wherein the first wall is longer than the second wall.

14. The hard disk drive of claim 13, wherein the air bearing surface substantially encloses a cavity.

15. The hard disk drive of claim 13, wherein the first gap and the second gap are between about 10 nm to about 50 nm wide.

16. The hard disk drive of claim 13, wherein the leading edge has a plateau that has a height of between about 0.05 microns and about 0.5 microns.

17. The hard disk drive of claim 13, wherein a plateau is present between the outside portion and the trailing portion and wherein the plateau has a height of between about 0.7 microns and about 0.85 microns.

18. The hard disk drive of claim 13, wherein the trailing portion encloses a plateau that has a height of between about 0.05 microns and about 0.5 microns.

* * * * *